April 26, 1966   E. E. CUNNINGHAM   3,248,203
APPARATUS FOR HEAT CONTROL OF FOREHEARTHS
Filed Oct. 30, 1961
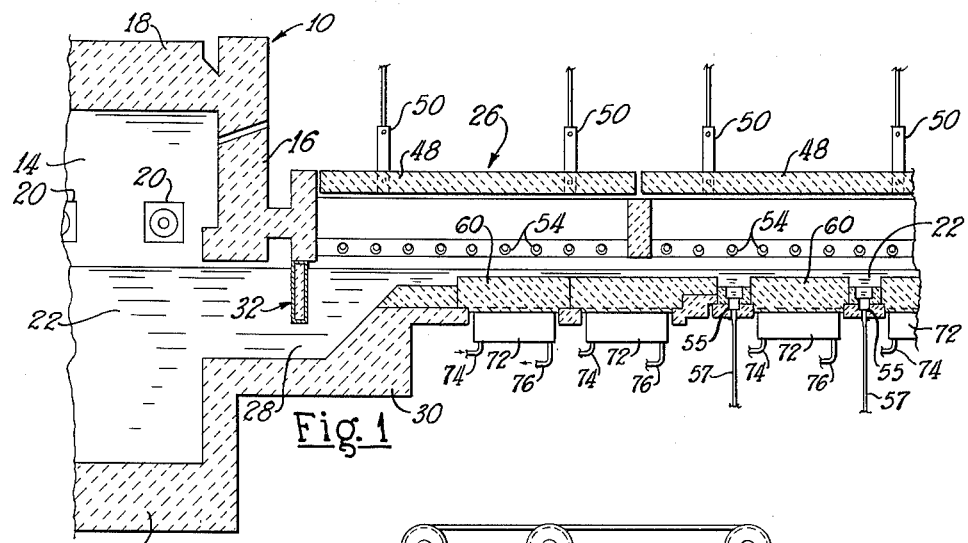
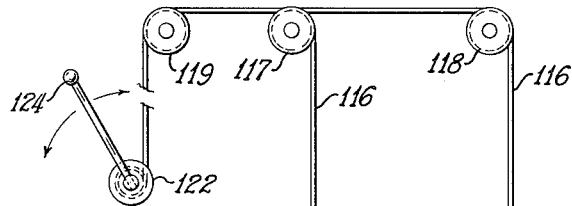
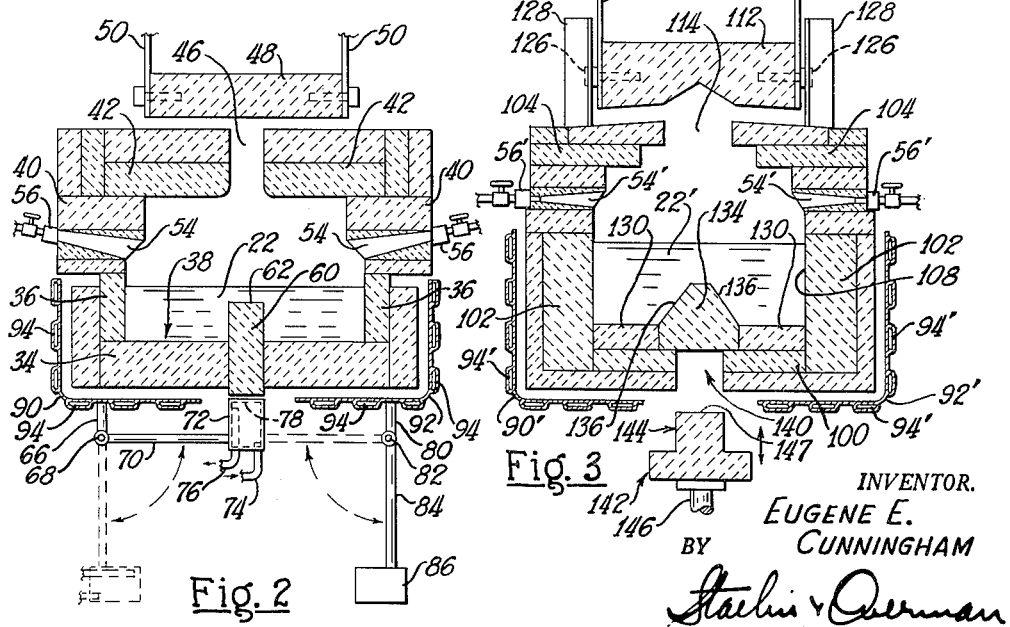
INVENTOR.
EUGENE E. CUNNINGHAM
BY
ATTORNEYS United States Patent Office 3,248,203
Patented Apr. 26, 1966

3,248,203
APPARATUS FOR HEAT CONTROL OF FOREHEARTHS
Eugene E. Cunningham, Newark, Ohio, assignor to Owens-Corning Fiberglas Corporation, a corporation of Delaware
Filed Oct. 30, 1961, Ser. No. 148,331
7 Claims. (Cl. 65—326)

This invention relates to method and apparatus for regulating or controlling heat loss or heat transfer from molten mineral material and more especially to method and apparatus for regulating or controlling heat loss or heat transfer from molten mineral material such as glass in a flow channel of a forehearth or other chamber containing molten mineral material.

It has been conventional practice to reduce glass batch or other mineral material to a molten or flowable condition in a melting furnace and to flow the molten glass or material through a flow channel in a forehearth to stations at which further processing of the glass or other material takes place. It is a usual practice to provide a forehearth construction with spaced heating means such as radiant burners disposed in the forehearth side walls or roof for the purpose of exercising control over the temperature and hence viscosity of the glass or mineral material in the flow channel in order to maintain the glass or material at a proper viscosity for further processing.

It has been found that the glass at the central or core region of the flow channel is hotter than the glass adjacent the side walls due to the conduction of heat from the glass at the regions of the side walls. This condition fosters viscosity variations transversely in the glass in the flow channel, affecting the homogeneity of the glass as well as increasing the rate of flow of glass in the central region of the flow channel as compared with the flow rate adjacent the walls of the channel. Thus nonuniform flow rates obtain in various cross sectional regions of the flow channel. This condition affects the processing of the glass at the processing stations due to the varying viscosity of the glass.

This invention embraces a provision of a method of controlling the heating and heat loss of the glass or mineral material in a flow channel whereby to establish more uniform characteristics of the flowable glass both transversely and lengthwise of the flow channel.

An object of the invention resides in the provision of a method of controlling the rate of heat transfer or heat loss from molten mineral material such as glass in order to maintain substantially constant the viscosity characteristics of the material in a channel or chamber.

An object of the invention resides in the provision of a controllable heat sink media for controlling or regulating the temperature and viscosity characteristics of a flowable mineral material in a flow channel.

Another object of the invention resides in the utilization of a heat sink for transferring heat away from a particular region of molten material in a flow channel or chamber and modifying or varying the rate of heat transfer or heat loss from the material by accelerating or impeding the rate of heat loss or transfer through the heat sink and thereby vary the heat sensitive characteristics of the flowable material.

A further object of the inventon is the provision of a plurality of heat sink means arranged along a forehearth flow channel for mineral material in combination with means individual to each heat sink means for individually controlling the rate of heat transfer through each heat sink.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a longitudinal sectional view through a portion of a melting furnace and forehearth construction illustrating a form of the invention;

FIGURE 2 is a transverse sectional view taken substantially on the line 2—2 of FIGURE 1 illustrating the invention, and FIGURE 3 is a transverse sectional view illustrating a modified form of construction of the invention.

While method and apparatus of this invention are particularly usable for regulating and controlling the transfer or loss of heat from molten material from a flow channel of a forehearth, it is to be understood that the invention may be employed for controlling temperature responsive characteristics of other heat-softened materials.

Referring to the drawings in detail and initially to the form of construction shown in FIGURES 1 and 2, 10 designates a melting furnace, a portion of which is illustrated, especially adapted for reducing glass batch or other batch material to a heat-softened or flowable condition. The melting furnace is inclusive of a floor 12, side walls 14, one of which is shown, end walls, the outlet end wall 16 of the furnace being shown in FIGURE 1 and a roof construction 18.

The material is reduced to molten condition and maintained in heat-softened or flowable condition by heating means or burners 20 spaced lengthwise of the furnace 10 and above the molten glass 22 in the furnace. In the embodiment illustrated, a forehearth construction 26 is connected with the outlet end of the melting furnace by a channel or throat 28 provided by a floor 30. A skimmer block 32 of conventional construction is disposed in the throat or connecting channel 28.

In the embodiment illustrated, the forehearth 26 is inclusive of a floor 34 and side walls 36 defining a glass flow channel 38 arranged to receive molten glass 22 from the melting furnace. The side walls 36 may be fashioned of blocks of refractory that is highly resistant to deterioration by contact with molten glass. The walls 36 of the forehearth are preferably formed of built-up or block sections. The upper sections 40 of the side walls 36 support roof blocks or plates 42 which are spaced at a region above the flow channel as indicated at 46 providing a venting means or passage for gases or other volatile matter emitted from the hot glass or mineral material 22.

Disposed above the vent space 46 and in overlapping relation with the roof plates 42 are control members or plates 48 preferably suspended by members 50 and arranged to be elevated or lowered by actuating means such as that shown in FIGURE 3 which will be hereinafter described. By rasing or lowering the vent plate 48, the passage for venting gases from the glass may be restricted and provides a measure of control of heat in the forehearth channel.

The side walls 36 are provided with lengthwise spaced ports 54 in which are disposed burners 56 for establishing heat above the molten glass 22 in the forehearth channel to maintain the glass in flowable condition. The forehearth is provided with lengthwise spaced feeders 55 from which streams 57 of glass are discharged for further processing.

The streams may be delivered from the feeders or processing stations 55 to fiber-forming apparatus (not shown) at which the glass is attenuated to fine fibers, or the glass may be processed by suitable apparatus for other purposes.

This invention provides a method and means for establishing and exercising control of heat loss or heat transfer from the central region of the molten glass in the forehearth channel so that the glass may be of the proper temperature and viscosity at processing stations to which the forehearth channel conducts the glass. One form of controllable heat sink means or heat loss control is illustrated in FIGURES 1 and 2.

Disposed centrally of the glass flow channel 38 and extending through the refractory floor 34 of the forehearth is a plurality of members, bars or blocks 60, preferably of rectangular shape aligned in end-to-end relation lengthwise of the forehearth channel and extending upwardly into the central region of the molten glass 22, the upper surfaces terminating slightly beneath the glass level in the forehearth channel. It is preferable that the portions of the blocks in the flow channel be covered by the molten glass. The blocks 60 extend a slight distance below the floor 34 of the forehearth construction as shown in FIGURE 2.

In the form shown in FIGURE 2, the upper surfaces 62 of the blocks should be disposed about one inch below the level of the glass 22 in the channel 38, the blocks extending about the same distance below the floor 34.

The members or blocks 60 are preferably made or formed of refractory such as chromic oxide. Chromic oxide is preferred because it is highly resistant to deterioration by the glass and has a comparatively high coefficient of heat transfer or conductivity so that under particular conditions it will conduct heat from the molten glass at a comparatively high rate and such characteristic enables an efficient and effective heat loss control.

Each of the chromic oxide blocks forms a heat sink medium for the molten glass in that the blocks conduct heat from the central region of the glass in the flow channel 38 exteriorly of the forehearth. The arrangement embraces means associated with heat sink means or blocks for controlling the rate of heat transfer by the chromic oxide member 60. The forehearth 26 may be of substantial length and it has been found preferable to employ a plurality of members 60 arranged in end-to-end relation whereby selective control of heat loss or heat transfer may be exercised in the flow channel at the region of each member or block 60.

As hereinafter described, means is provided adjacent each block or member 60 to modify or vary the rate of heat loss or heat transfer providing individual control adjacent each block or member 60. Disposed adjacent the floor 34 of the forehearth channel is a frame structure 66. The frame structure 66 is provided with shafts 68 which pivotally supports supplemental frames or arms 70 spaced lengthwise of the forehearth. Each supplemental frame or arm 70 supports a receptacle 72 provided with inlet and outlet tubes 74 and 76 respectively.

A receptacle 72 is disposed adjacent each heat sink means or bar 60 and is arranged to receive and accommodate a circulating heat-absorbing fluid which may be introduced through the inlet pipe 74 and withdrawn through the outlet pipe 76 provided for each receptacle. It should be noted from FIGURE 2 that the outlet pipe 76 extends upwardly within the chamber or receptacle 72 to a point just below the upper wall 78 of the receptacle. Through this positioning of the outlet pipe, the heat-absorbing fluid flows upwardly through the upper region of the container before flowing through the discharge pipe.

Any suitable heat-absorbing fluid may be employed such as cooling water or a refrigerant depending upon the desired rate of withdrawal of heat from the glass through the medium of the heat sink media or arrangement. As each receptacle 72 is mounted upon a pivotally supported supplemental frame 70, the receptacles may be selectively moved to an out-of-use position away from the blocks 60 to the broken line position illustrated in FIGURE 2.

The receptacles 72, accommodating the heat-absorbing or cooling fluid, are illustrated in operative positions in FIGURES 1 and 2 in contact with the lower faces or surfaces of the blocks 60 and are utilized in such positions when it is desired to withdraw heat from the central region of the glass in the flow channel at a comparatively high rate. When the receptacles 72 are in an operative position, heat flow or the conduction of heat through the blocks or heat sink means 60 is accelerated due to the increased rate of transfer of heat from the blocks to the circulating cooling fluid flowing through the receptacles.

Under certain operating conditions, the heat sink blocks 60 may transfer sufficient heat away from the central region of the glass in the flow channel without the use of the receptacles and circulating fluid contained therein by radiation of heat from the heat sink blocks into the ambient air. In certain instances a conventional fan or blower (not shown) may be employed adjacent the exterior surfaces of the blocks 60 to circulate atmospheric air to thereby increase the rate of transfer of heat from the heat sink blocks 60 to the atmosphere as compared to the rate of heat transfer to quiescent air.

Another form of control resides in the provision of an insulating means which may be brought into effective insulating position adjacent exterior surfaces of the heat sink blocks to retard or impede the transfer of heat from the heat sink blocks 60 to the region beneath the forehearth. A frame 80 is disposed adjacent the forehearth as illustrated in FIGURE 2. The frames 66 and 80 may be independent or they may be oriented into a single frame construction if desired. The frame 80 supports shafts or pins 82 upon which supplemental frames or arms 84 are pivotally supported.

Secured to the distal ends of each of the supplemental frames 84 is a member or block 86 of insulating refractory material. The insulating members 86 may be clay brick or other suitable heat resistant refractory having comparatively low heat conduction or heat transfer characteristic.

When it is desired to impede or retard heat transfer through a heat sink block 60, the adjacent block 86 may be swung into a position beneath and in contact with the block 60. Through this arrangement, the rate of heat transfer through the heat sink blocks 60 may be effectively impeded or retarded due to the low heat conductivity of the insulating blocks 86.

The arms or supplemental frames 70 and 84 may be manipulated by suitable apparatus (not shown) for actuating the arms to selectively move the receptacles 72 or the insulating blocks 86 into and out of operative positions. This arrangement provides selective control of heat loss or heat transfer lengthwise in various regions of the forehearth channel.

As shown in FIGURE 2, cooling panels 90 and 92 may be disposed adjacent the floor regions and portions of the side walls of the forehearth construction. The panels 90 and 92 are fashioned with ducts or passages 94 to accommodate circulating cooling fluid, such as water, for conveying away heat ambient the exterior region of the forehearth so as to reduce the temperature of the room. The forehearth construction is preferably formed of built-up sections, blocks or plates of refractory of a character best suited for the type of glass or mineral material accommodated in the forehearth.

The refractory employed in the floor and side wall regions of the flow channel is preferably of a character which is highly resistant to deterioration by the glass or mineral material in the flow channel.

The arrangement shown in FIGURES 1 and 2 provides for effective heat sink control or heat loss control through the following factors: By exposing the exterior surfaces of the heat sink blocks 60 to a quiescent atmosphere exteriorly of the forehearth floor, the amount of heat conducted by the blocks 60 to the atmosphere approximates the normal heat transfer or conductivity of the blocks in the absence of other factors which would influence heat transfer.

The rate of heat transfer by the heat sink blocks 60 may be accelerated above the rate of heat transferred in a quiescent atmosphere by directing an air stream or circulating atmospheric air adjacent the exterior surface areas of the blocks 60. If a comparatively high rate of heat transfer is desired through the heat sink blocks 60, the receptacles 72 are moved to effective or operative positions, indicated in FIGURES 1 and 2, and a cooling fluid such as water or a refrigerant circulated through the receptacles in order to efficiently and effectively convey away heat transferred from the heat sink blocks.

For most effective heat transfer of this character, the upper surface 78 of a receptacle should be in intimate contact with the lower surface of a block 60. The heat sink media are spaced from the side walls of the channel and are preferably disposed in the central region of the molten material in a flow channel or chamber for effecting heat loss or transfer of heat from the glass at the central region so that the temperature and viscosity characteristics of the glass or molten material in regions transversely of the channel or chamber are more uniform so as to promote the flow of glass or other material of homogeneous character and uniform viscosity at stations 55 for further processing.

FIGURE 3 illustrates a modified arrangement of heat sink media for a flow channel or chamber containing molten mineral material. The forehearth construction is inclusive of a floor 100 which may be of laminated character comprising refractory plates or blocks, as illustrated, the forehearth having side walls 102 and a roof construction 104, the roof construction being formed of refractory plates or blocks in stacked relation.

Regions of the side walls 102 above the level of the glass are provided with openings 54′ accommodating radiant burners 56′ which provide radiant heat in the region above the glass or other material 22′ for maintaining the body of glass in flowable condition. The floor and side walls define a flow channel or chamber 108 adapted to contain molten glass 22′ or other heat-softened flowable material. Arranged above the roof structure 104 is a cap or member 112 for controlling the escape of heat and gases from the material through a vent space 114 provided at the central region of the roof structure 104.

The plate 112 is suspended by members 50′ connected with cables 116, the cables passing over pulleys 117, 118 and 119. The cables are connected with a drum or winch 122 manipulated by a crank 124 for elevating and lowering the vent control plate 112. The vent control plate is preferably provided with members 126 extending into vertically arranged slots formed in upwardly extending struts 128 for guiding the vent control plate 112 in its movements toward or away from the vent passage 114.

It will be obvious that by varying the position of the vent plate 112, a measure of control is exercised over the transfer or loss of heat by convection from the glass 22′ and the gases from the glass and the gases from the combustion burners 56′. Cooling panels 90′ and 92′ of the character shown in FIGURE 2 are associated with the forehearth shown in FIGURE 3. The panels 90′ and 92′ are formed with passages 94′ accommodating circulating cooling fluid such as water for conveying away a large portion of the heat radiated exteriorly from the forehearth.

The floor structure of the forehearth includes an upper layer of reractory 130 and disposed centrally of the flow channel 108 is a heat sink media comprising a plurality of members or blocks 134 of refractory arranged in end-to-end relation and having a comparatively high heat transfer coefficient. For example, the heat sink blocks may be fashioned of chromic oxide. The members 134 in this form may be provided with convergently arranged lateral surfaces 136 to provide substantial surface areas in contact with the glass or molten material. With the construction involving the convergently arranged surfaces 136 the heat sink member 134 may be advantageously fashioned of greater width than the blocks 60 shown in FIGURE 2.

The floor structure 100 of the forehearth is provided with a lengthwise recess or opening 140 of a transverse dimension to receive blocks or control members 142, each block 142 having a portion 144 of a width to be snugly, yet slidably received in the recess 140 in the forehearth floor.

Each control member 142 is preferably supported by a member 146 which may be adjusted vertically to regulate or control the relative position of the portion 144 with respect to the recess 140 and the lower surfaces of the heat sink members 134 for regulating the rate of heat transfer or heat loss through the heat sink means 134.

While the members 142 are illustrated as being of insulating refractory to retard or impede heat flow through the heat sink means, it is to be understood that receptacles such as illustrated at 72 in FIGURE 2 may be employed if more rapid or accelerated heat transfer from the heat sink members 134 is desired. The heat transfer through the heat sink bars or members 134 is at a minimum when the portions 144 are fully inserted in the slot or recess 140 with the upper surfaces 147 of the members 142 in contact or engagement with the lower surfaces of the heat sink bars 134. By moving a block 142 downward, increased heat transfer or flow through the adjacent heat sink 134 is increased by conduction of heat directly into the air in the recess 140. If greater rate of heat transfer is desired a blower may be employed to direct moving air into the recess 140.

A plurality of heat sink members and control members 142 may be employed lengthwise of the forehearth in the same manner as hereinbefore explained in connection with the arrangement illustrated in FIGURES 1 and 2.

In the arrangement illustrated in FIGURE 3, heat is transferred through or lost through the heat sink media 134 derived from the central region of the glass or molten material in the forehearth channel so as to establish more uniform temperature and viscosity characteristics transversely through the glass or material in the forehearth channel.

Through the arrangements above described, it will be seen that a method and apparatus is provided for heat-conditioning heat-softened material such as glass through the utilization of heat sink media or means in contact with the heat-softened material in a channel or chamber wherein the heat sink means is spaced from the side walls of the chamber or flow channel. The heat sink means is preferably disposed at the central region of the chamber or flow channel and controlled heat loss or heat transfer is effected through the heat sink exteriorly of the channel or chamber. The arrangement includes means for modifying the ambient conditions at the zone exteriorly of the forehearth to regulate or influence the rate of heat flow or heat loss through the heat sink means to promote the establishment of more uniform temperature and viscosity of the glass in directions lengthwise and transversely of the flow channel or chamber. This regulation may be effected by transfer of heat through the heat sink to the air adjacent the exterior surface area of the heat sink means, or heat transfer increased by forced circulation of air in the region of the exterior surface of the heat sink means.

If further increase in heat loss rate or heat transfer flow rate is desired, a heat-absorbing fluid such as water or a refrigerant may be circulated adjacent the heat sink means. If reduction in heat loss or heat transfer is desired, a refractory means having insulating characteristics may be engaged with the heat sink means to retard or impede the rate of heat transfer or heat loss through the heat sink means. While the heat sink means is illustrated in two forms or configurations respectively shown in FIGURES 2 and 3, it is to be understood that heat sink means or media of other shapes may be employed for promoting or influencing heat loss or heat transfer from the molten glass or other mineral material in a flow channel or chamber.

It is apparent that, within the scope of the invention, modifications and different arrangements may be made other than as herein disclosed, and the present disclosure is illustrative merely, the invention comprehending all variations thereof.

I claim:

1. Apparatus for conditioning heat-softened glass, in combination, a forehearth channel arranged to contain heat-softened glass, a heat sink body extending through the floor of the channel and projecting upwardly into the central region of the channel in heat-transferring relation with the glass in the channel, said heat sink means having a surface area exposed exteriorly of the floor of the channel for transferring heat away from the glass.

2. Apparatus for conditioning heat-softened glass, in combination, a walled channel arranged to contain heat-softened glass, a heat sink body formed of chromic oxide projecting upwardly through the floor of the channel and spaced from side walls of the channel in heat-transferring relation with the glass in the channel, said heat sink body having a surface exposed exteriorly of the chamber for transferring heat away from the material.

3. Apparatus for conditioning heat-softened glass, in combination, a forehearth formed with a walled flow channel for accommodating heat-softened glass, a heat sink body projecting upwardly through the floor of the channel and spaced from the side walls of the channel, said heat sink body being in heat-transferring relation with the glass in the channel, said heat sink body having a surface area exposed to the atmosphere at an exterior region of the forehearth, and heat absorbing means arranged in heat tarnsferring relation with the exposed surface area of the heat sink body for regulating the rate of heat transfer through the heat sink means.

4. Apparatus for conditioning heat-softened glass, in combination, a forehearth formed with a flow channel for accommodating heat-softened glass, a plurality of heat sink bodies disposed lengthwise of the channel projecting upwardly through the floor of the channel and spaced from the side walls of the channel, said heat sink bodies being in heat-transferring relation with the glass in the channel, each of said heat sink bodies having a surface area exposed to the atmosphere exteriorly of the forehearth, and heat absorbing means for varying the heat transfer conditions adjacent the exposed surface areas of the heat sink bodies.

5. Apparatus for conditioning heat-softened glass, in combination, a forehearth formed with a flow channel for accommodating heat-softened glass, heat sink means disposed lengthwise of the channel projecting upwardly through the floor of the channel and spaced from the side walls of the channel, said heat sink means being in heat-transferring relation with the glass in the channel, said heat sink means having a surface area exposed to the atmosphere at an exterior region of the forehearth, a heat absorbing body associated with the exposed surface area, and means for adjusting the position of the heat absorbing body relative to the heat sink means for controlling the rate of heat transfer from the glass through the heat sink means.

6. Apparatus for conditioning heat-softened glass, in combination, a forehearth formed with a flow channel for accommodating heat-softened glass, the floor of the channel having orifice means for discharging the glass from the channel, and a heat sink body in said channel spaced from the side walls of the channel, said heat sink body being disposed in heat-transferring relation with the glass and extending upwardly through the forehearth floor for transferring heat away from the glass.

7. Apparatus for conditioning heat-softened glass, in combination, a forehearth formed with a flow channel for accommodating heat-softened glass, the floor of the channel having orifice means for discharging the mineral material from the channel, heat sink means extending lengthwise of the channel and spaced from the side walls thereof, said heat sink means being disposed in heat-transferring relation with the glass and extending upwardly into the channel through an opening in the forehearth floor for transferring heat away from the glass, and heat absorbing means arranged exteriorly of the forehearth for influencing the rate of heat transfer through the heat sink means.

References Cited by the Examiner

UNITED STATES PATENTS

| 788,142 | 4/1905 | Pease | 65—83 |
| 1,557,148 | 10/1925 | Ferngren | 65—337 |
| 2,098,625 | 11/1937 | Honiss | 65—162 |
| 2,440,187 | 4/1948 | Silverberg | 65—372 |
| 2,691,247 | 10/1954 | Henry et al. | 65—204 |

FOREIGN PATENTS 794,292   4/1958   Great Britain.

DONALL H. SYLVESTER, *Primary Examiner.*